(12) United States Patent
Wilson et al.

(10) Patent No.: US 7,919,891 B2
(45) Date of Patent: Apr. 5, 2011

(54) DIRECTED FLUX MOTOR

(75) Inventors: Andrew Wilson, Allison Park, PA (US);
Andrew Punnoose, Ashburn, VA (US);
Katherine Strausser, Houston, TX (US); Neil Parikh, North Brunswick, NJ (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 12/888,858

(22) Filed: Sep. 23, 2010

(65) Prior Publication Data
US 2011/0012454 A1    Jan. 20, 2011

Related U.S. Application Data

(63) Continuation of application No. 12/188,039, filed on Aug. 7, 2008, now abandoned.

(60) Provisional application No. 60/954,908, filed on Aug. 9, 2007, provisional application No. 61/086,627, filed on Aug. 6, 2008, provisional application No. 61/087,033, filed on Aug. 7, 2008, now abandoned.

(51) Int. Cl.
*H02K 51/00* (2006.01)
*H02K 16/02* (2006.01)
*H02K 7/116* (2006.01)

(52) U.S. Cl. ............... 310/83; 310/114; 310/154.33; 475/331

(58) Field of Classification Search ............ 310/112, 310/114, 126, 83, 154.33; 475/331, 332, 475/344; 74/665 GA, 665 K
See application file for complete search history.

(56) References Cited

U.S. PATENT DOCUMENTS

| 4,530,413 | A | * | 7/1985 | Buike et al. | 180/444 |
| 5,677,582 | A | * | 10/1997 | Lutz et al. | 310/75 R |
| 6,626,792 | B2 | * | 9/2003 | Vranish | 475/331 |

FOREIGN PATENT DOCUMENTS

| DE | 19647469 | * | 8/1998 |
| EP | 1642820 | * | 4/2006 |
| WO | 00/21183 A1 | * | 4/2000 |

* cited by examiner

*Primary Examiner* — Burton Mullins
(74) *Attorney, Agent, or Firm* — Heather Goo

(57) ABSTRACT

A directed flux motor described utilizes the directed magnetic flux of at least one magnet through ferrous material to drive different planetary gear sets to achieve capabilities in six actuated shafts that are grouped three to a side of the motor. The flux motor also utilizes an interwoven magnet configuration which reduces the overall size of the motor. The motor allows for simple changes to modify the torque to speed ratio of the gearing contained within the motor as well as simple configurations for any number of output shafts up to six. The changes allow for improved manufacturability and reliability within the design.

14 Claims, 7 Drawing Sheets

DIRECTED FLUX MOTOR

CROSS-REFERENCE TO RELATED APPLICATION(S)

This application claims the benefit of priority of U.S. Provisional Application No. 60/954,908 filed in the U.S. Patent & Trademark Office on Aug. 9, 2007, U.S. Provisional Application No. 61/086,627 filed in the U.S. Patent & Trademark Office on Aug. 6, 2008, and U.S. Provisional Application No. 61/087,033 filed in the U.S. Patent & Trademark Office on Aug. 7, 2008 now abandoned; the complete disclosures of each, in their entireties, are hereby incorporated by reference. This application is a continuation application of U.S. application Ser. No. 12/188,039, entitled "DIRECTED FLUX MOTOR," filed Aug. 7, 2008 now abandoned. The content of this application is hereby incorporated by reference.

ORIGIN OF THE INVENTION

The invention described herein was made by employees under contract with the United States Government and may be manufactured and used by or for the Government for Government purposes without the payment of any royalties thereon or therefore.

FIELD OF THE INVENTION

The invention relates to flux motors that actuate several degrees of freedom in general and, in particular, a directed flux motor for independently actuating multiple output shafts.

DESCRIPTION OF RELATED ART

Generally, electromagnetic motors use the principle of electromagnetic attraction in which an electromagnetic flux path is controlled to cause rotation of the rotor. Electromagnetic motors use both attraction and repulsion to drive the rotor with added force. However, electromagnetic motors are limited in terms of compactness and the number of degrees of freedom. Electromagnetic motors usually are only able to achieve a single degree of freedom and require several permanent magnets, increasing the mass of the motor. Also, coils of electromagnetic motors are not placed on the stator teeth, thereby decreasing the effectiveness in controlling flux across air gaps.

Directed flux motors present a fundamental solution to create a compact package to drive multiple independent output shafts from a permanent magnet set, allowing for several degrees of freedom. A directed flux motor design directs magnetic flux using a combination of electromagnets and guides made of a magnetically permeable material. Permanent magnets grouped in the center of the motor provide the flux source. Materials permeable by magnetic flux, usually ferrous, are aligned to direct the flux along specific paths. The electromagnets are placed along the paths and selectively switched on and off to block the path of the flux through the magnetic circuit. The combination of the magnet orientation and direction of the flux allows the directed flux motor to achieve several independent, concentric output shafts. In addition, the incorporation of concentric gear bearings into the motor design allows for torque amplification without external gearing.

With the increasing number of degrees of freedom attainable by directed flux motors, the design can become bulky. For example, accommodating five shafts requires a double magnet ring arrangement. As the complexity increases, the ease and practicality of manufacture and use are compromised. For example, current is applied to each of a large number of electromagnets to permit stator teeth to attract armature teeth and to block this attraction. Current must be applied to a large number of the total electromagnets, resulting in a large current requirement for effective operation.

SUMMARY OF THE INVENTION

A directed flux motor comprises a permanent disc magnet surrounded by a first ferrous metal member non-rotatably fixed to the permanent disc magnet; and a second ferrous metal member non-rotatably fixed to the permanent disc magnet. A non-ferromagnetic filler interposed between said permanent disc magnet, the first ferrous metal member, and the second ferrous metal member. The filler provides an electrically isolating of the permanent disc magnet, the first ferrous metal member, and the second ferrous metal member. The permanent magnet generates at least two magnetic flux paths through said first and second ferrous metal members to drive first and second planetary gear assemblies driven to rotate by the magnetic flux paths. Each of the first and second planetary gear assemblies including at least one stationary member including stator teeth wound with wire to define an electromagnet and at least one rotating body including rotor teeth. The flux traveling through the magnetic flux paths causes rotation of the rotor teeth to thereby drive the planetary gear assemblies. The planetary gear assemblies drive multiple output shafts to rotate.

The directed flux motor described herein utilizes the directed magnetic flux of at least one magnet through ferrous material to drive different planetary gear sets to achieve capabilities in six actuated shafts that are grouped three to a side of the motor. The flux motor also utilizes an interwoven magnet configuration which reduces the overall size of the motor. The motor allows for simple changes to modify the torque to speed ratio of the gearing contained within the motor as well as simple configurations for any number of output shafts up to six. The changes allow for improved manufacturability and reliability within the design.

Other aspects of the invention, including devices, apparatus, systems, and methods, will become more apparent from the following detailed description and accompanying drawings.

BRIEF DESCRIPTION OF THE DRAWINGS

The accompanying drawings are incorporated in and constitute a part of the specification. In such drawings.

DETAILED DESCRIPTION OF EXEMPLARY EMBODIMENTS THE INVENTION

Figure 1:
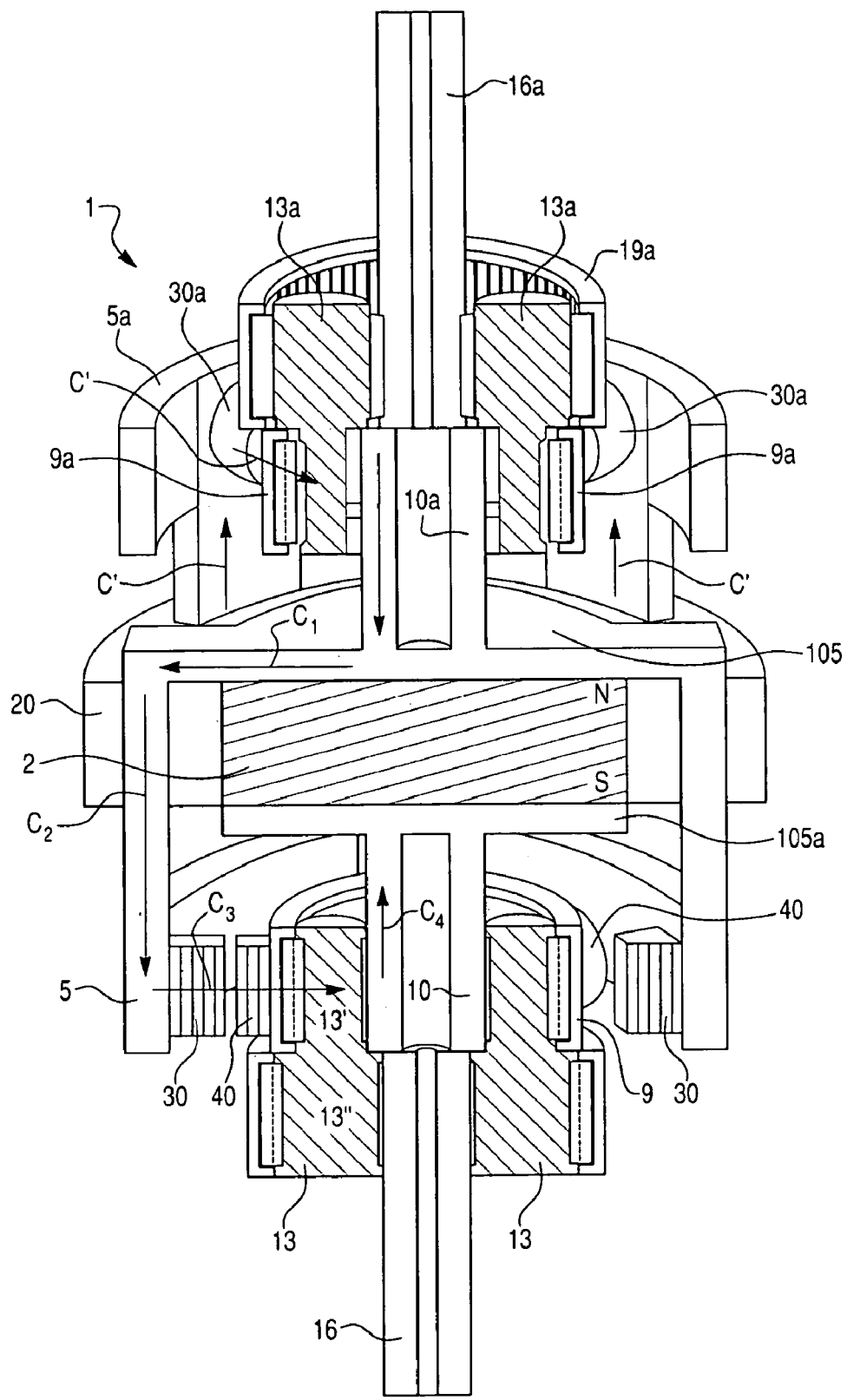
FIG. 1 illustrates a front perspective, cross-sectional view of a directed flux motor providing two degrees of freedom according to an embodiment of the invention.

With reference to FIG. 1, a directed flux motor according to a first embodiment of the invention is generally designated by reference numeral 1. The directed flux motor 1 of the first embodiment of the invention utilizes the fundamental concept of directed magnetic flux to achieve rotation through at least two degrees of freedom using a single magnet. As will be discussed with regards to other embodiments described below, the principals of the present invention can be applied to independently control, for example, four, six, and other numbers of output shafts grouped symmetrically on opposite sides of the motor.

According to exemplary embodiments described below in reference to FIG. 1 and other figures, independent control of output shafts is achieved using interwoven and nested flux paths, electromagnet winding at the stator teeth, and/or a combination of attraction and repulsion of the rotor teeth. This capability of independently operating and controlling multiple shafts allows for a wide field of use in vehicle design and rover design as well as applications in other industries. Each degree of freedom can have a different speed and torque combination which can be tailored to the particular use of the motor. The present invention as embodied in certain exemplary embodiments described herein permits for a reduction of the permanent magnet requirement. For example, in an embodiment to be described below, output shafts are enabled for independent operation utilizing a single magnet ring arrangement. Reducing the number of magnets allows for reduction in the depth and overall size of the motor. Beneficially, certain embodiments described herein may be manufactured with minor retrofitting or changes to existing manufacturing equipment.

The embodiment illustrated in FIG. 1 allows for at least two degrees of freedom. The directed flux motor 1 includes a permanent disc magnet 2 surrounded at its outer circumference by a non ferromagnetic filler 20. A grounded outer ring 5 is mounted on the permanent disc magnet 2. The term grounded as used herein refers to a non-rotating body. The grounded outer ring 5 is formed with, as a unitary body, a ferromagnetic plate 105 of ferrous material resting above permanent disc magnet 2.

The grounded outer ring 5 includes stator teeth 30 which are provided on the inside surface of the ring 5. The stator teeth 30 are wound with wire to function as an electromagnet, i.e., electromagnetic windings, as will be described in more detail below.

Facing the stator teeth 30 is a rotatable ring 9 supporting a plurality of rotor or armature teeth 40. Each rotor or armature tooth 40 is a permanent magnet capable of being repelled by or attracted to adjacent stator teeth 30 as electromagnetic forces are applied to the stator teeth 30. In the illustrated embodiment, the number of rotor teeth 40 is greater than the number of stator teeth 30. In the embodiment illustrated in FIG. 1 there four (4) stator teeth 30 and five (5) rotor or armature teeth 40 are provided, although different tooth numbers and configuration are envisioned and encompassed by this invention.

The rotatable ring 9 surrounds a plurality of planet gears 13 formed with and functioning as gear bearings, as described in U.S. Pat. No. 6,626,792, which is hereby incorporated by reference in its entirety. The planet gears 13 are toothed members that engage corresponding teeth on the rotatable ring 9 and a grounded sun 10. As the rotatable ring 9 rotates, the planet gears 13 will rotate and travel around the grounded sun 10 in a manner that is known to those of skill in the art of planetary gearing systems.

The planet gears 13 have a top portion 13' and a bottom portion 13", wherein the terms "top" and "bottom" are used in relation to the orientation of the motor 1 in FIG. 1. In the illustrated embodiment the top portion 13' has a smaller diameter than a bottom portion 13." The multi-diameter design of the planet gears 13 is employed to obtain a torque reduction with respect to an idler ring 19. More specifically, torque reduction is achieved because the outer diameter of the top portion 13' of planet gears 13 rotates at a higher speed and lower torque than the outer diameter of the lower portion 13". The bottom portions 13" of planet gears 13 extend below (in reference to FIG. 1) the grounded sun 10 to engage an output shaft 16 to the inside of the lower portions 13" of the planet gears 13, and to engage an idler ring 19 to the outside of the lower portion of the lower portions 13" of the planet gears 13. The teeth situated about the enlarged bottom portion 13" of the planet gears 13 drive the inner output shaft 16.

The foregoing description has referred mostly to parts and reference numerals best shown in relation to the bottom half of motor 1 shown in FIG. 1. The top or upper half of the motor 1 of FIG. 1 comprises a substantially identical flux motor and planetary gear system. For example, the upper half of the flux motor 1 includes a body formed of a grounded outer ring 5a and ferromagnetic plate 105a nested within the body in a similar manner to grounded outer ring 5 and ferromagnetic plate 105 discussed above. Like parts of the upper half of the flux motor 1 have been designated with like reference numerals, with the addition of the suffix "a." In the interest of brevity the above description will not be repeated here for the upper half of motor 1. The magnet 2 is sandwiched between the ferromagnetic plates 105, 105a, which are electrically isolated by the filler 20.

Operation of the bottom portion/half of the directed flux motor 1 of FIG. 1 will now be described. As understood by those of skill in the art, flux travels from the North Pole (N) of a disc magnet 2 toward the South Pole (S), and vice versa, preferably along a ferrous path provided, for example, by the grounded outer ring 5. The first directed flux path segment C1 begins at the top of the disc magnet 2 and travels across and down the grounded sun ring 5 at flux path segment C2. The flux will seek out the next shortest path of travel back to the south pole (S) so it will tend to jump across the air gap between the stator 30 and the rotatable ring 9 at path C3 from the stator teeth 30 to the rotor teeth 40. Next, the flux travels from the rotatable ring 9 and across planet 13, then along path C4 up the input ring 9, finally terminating at the bottom or South Pole (S) of the disc magnet 2.

Path segments (C1-C4) for the flux are created by using ferromagnetic material which has a high magnetic permeability as compared to air. The magnetic flux will have a higher concentration along the paths of ferromagnetic material, hereafter referred to as flux channels or paths. This concentration of magnetic flux travels across the air gap for each of the gear bearing assemblies. The stator and rotor teeth 30, 40 which protrude on each side of the air gap concentrate the flux and provide the shortest path for the magnetic flux to cross at specific desired points. The completion of the magnetic circuit across the air gap between the teeth 30, 40 creates an attractive force between the closest teeth on either side of the air gap.

This embodiment uses the controlled delivery of energy to the electromagnetic tooth windings to control the attraction and repulsion between the stator and rotor teeth 30, 40 in a manner similar to the control of a conventional stepper motor, as known to those of skill in the art. The electromagnet force generated at each stator tooth 30 will induce rotation of the rotatable input ring 9 by controlling attractive and repulsive forces between the electromagnets of the stator teeth 30 and the permanent magnets of the rotor teeth 40. The control system will energize a particular stator tooth 30 as a rotor tooth 40 approaches to induce an attractive force between adjacent teeth 30, 40. As the rotor tooth 40 passes the stator tooth, the polarity of the same stator tooth 30 is reversed to create a repulsive force between the adjacent stator and rotor teeth 30, 40. The rotating motion induced in the rotatable input ring 9 activates the planetary gear system defined by the planet gears 13, grounded sun 10, the idler ring 19, causing the output shaft 16 to rotate.

Figure 5:
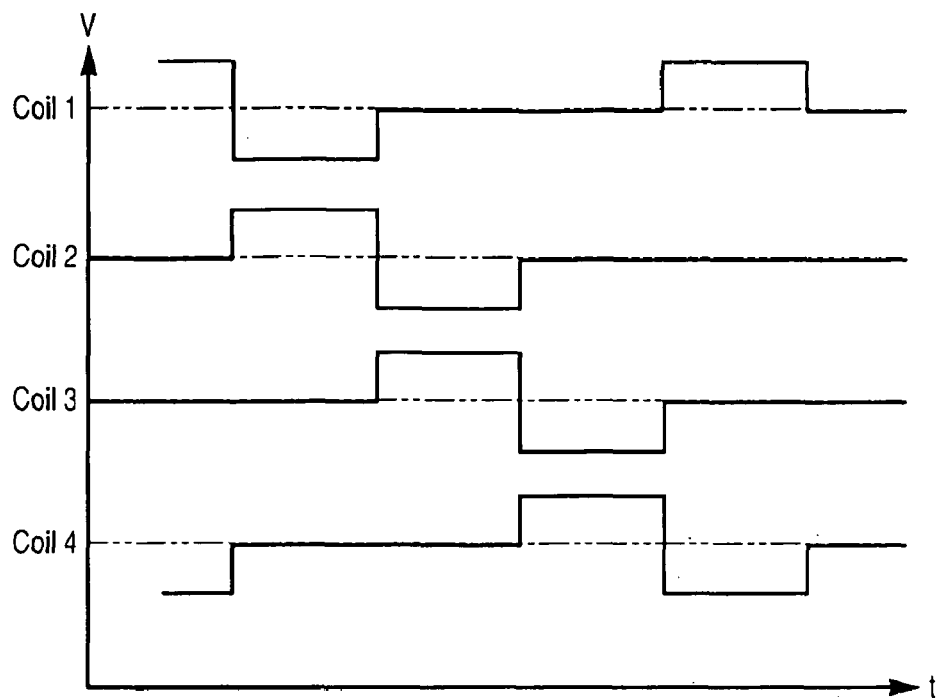
FIG. 5 illustrates in graphical format the attraction and repulsion control input across the stator teeth wound as electromagnets in accordance with an embodiment of the invention.

FIG. 5 shows a control graph according to an embodiment of the invention for controlling the voltage (V) as a function of time (t) for the four coils provided on the four stator teeth 30. FIG. 5 illustrates the timed electromagnetic energy provided to each coil of stator teeth 30 with a timed reversal of polarity as each rotor tooth 40 passes the selectively controlled electromagnet provided at each coiled stator tooth 30.

The motor 1 of FIG. 1 provides first and second coaxial drive axles 16, 16a respectively extending in opposite directions. A directed flux system is created in both the bottom and top halves of the directed flux motor 1. As such, the motor of FIG. 1 provides two degrees of freedom by providing independent control over two output drive shafts 16, 16a. One flux path provides drive rotation of the output shaft 16 while the other flux path provides drive rotation of the output shaft 16a. As shown in FIG. 1, the grounded ring 5 and ferromagnetic plate 105 are electrically isolated from a similar grounded ring 5a and ferromagnetic plate 105a in the top half of the motor 1 of FIG. 1. More specifically, the non-ferrous filler 20 interposed between the grounded ring 5 and the mirrored, nested and grounded ring 5a establishes electrical isolation between the two paths. With the nested or interwoven flux path system of FIG. 1, the flux path shown by segments C1-C4 is replicated in the top half of the motor 1 by a flux path C'.

As shown in FIG. 1, flux path C' exits the bottom or south pole (S) into the ferromagnetic plate 105a (formed as part of the input ring 10). The flux path C' then travels up the grounded ring 5a and across an air gap provided between the stator teeth 30a and rotor teeth (not shown) on the rotatable ring 9a. Like the flux path of segments C1-C4 in the lower half of motor 1, the flux path C' in the upper half of the motor 1 travels through the planet gears 13a and down the input ring 10a back to the magnet 2 to complete the flux path and corresponding circuit. The ground ring 5a is similarly provided with stator teeth 30a which are wound with wire to establish electromagnets. These electromagnets are controlled similarly to the electromagnets of stator teeth 30, for example, as shown in FIG. 5, to induce an attractive and repulsive force between the stator teeth 30a and corresponding permanent magnets of the rotor teeth (not shown) provided on the rotatable ring 9a. The rotating motion induced in the rotatable ring 9a causes rotation of the lower planetary gears 13a', between the grounded sun 10a and the idler ring 19a, to cause upper planetary gears 13a" to rotate the output shaft 16a.

Thus, the single magnet 2 creates two flux paths, the first defined by segments C1-C4 and the second designated as C', to provide two degrees of freedom by driving two different shafts 16, 16a independently of one another through control of the electromagnets.

As mentioned above, the two flux paths are isolated from one another by the filler 20. More particularly, in the illustrated embodiment the filler 20 isolates the lower grounded ring 5 from the upper ground ring 5a. It will be understood from FIG. 1 that these two grounded rings 5, 5a are nest within each other and separated by the magnet 2 at the center of the motor 1 of FIG. 1 and the filler 20 at the periphery of the motor 1. This nested arrangement reduces the overall size of the motor 1.

It should be understood that various modifications and variations may be implemented to this embodiment and are within the purview of a person skilled in the art. For example, although a singled flux path is shown in FIG. 1, it will be understood by those of skill in the art that the same flux paths C1-C4 may travel throughout the entire grounded ring 5 with the circuit being completed at locations where the stationary stator teeth 30 come into close proximity to the rotor teeth 40.

The first embodiment of the invention demonstrates at least two main improvements over state-of-the-art motor designs. The first improvement is attributed to the use of electromagnets, which in the first illustrated embodiment are formed by wire wound about the stator teeth 30. In this improvement, the flux path is created naturally using a combination of ferromagnetic and non-ferromagnetic materials, thereby negating the necessity to continuously power the electromagnets along the flux path, providing an overall reduction in power consumption. The second improvement stems from the use of both attractive and repulsive forces, rather than attractive forces alone, to drive the system. The combination of attraction and repulsion provides better control, more power, and more torque for the various applications of the motor 1.

Figure 2:
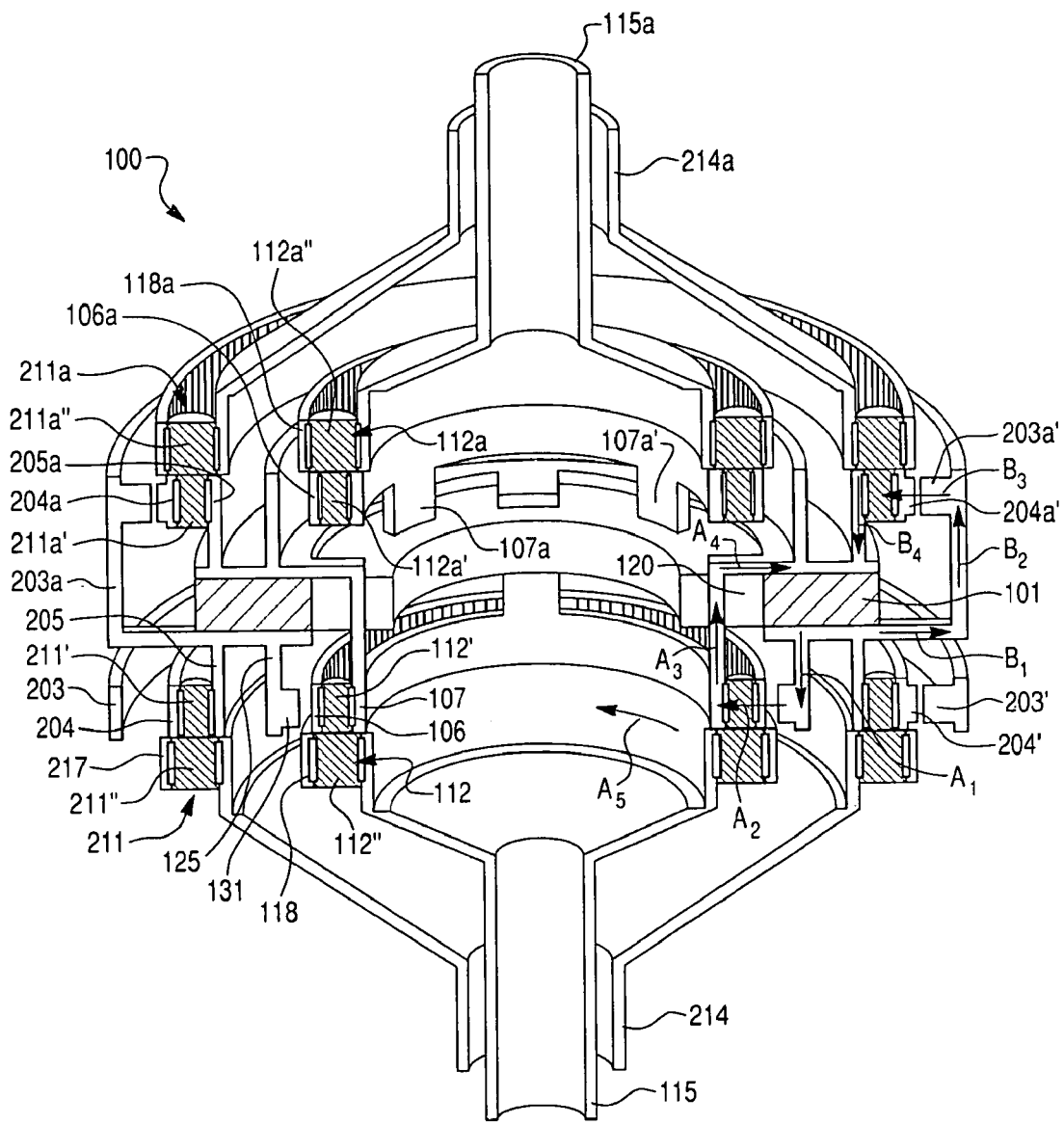
FIG. 2 illustrates a front perspective, cross-sectional view of a directed flux motor providing four degrees of freedom according to another embodiment of the invention.

A directed flux motor characterized by four degrees of freedom according to a second embodiment of the invention is illustrated in FIG. 2 and generally designated by reference numeral 100. The directed flux motor 100 of FIG. 2 shares many structural similarities to the first embodied motor of FIG. 1, and boasts improvements over the same.

The directed flux motor 100 of FIG. 2 is constructed of a pair of concentric output shaft assemblies centered on a ring magnet 101. A non-ferromagnetic filler 120 insulates the interior of the ring magnet 101. The directed flux motor 100 of FIG. 2 includes inner output assemblies and outer output shaft assemblies at both its upper and lower ends, as described below.

The inner output shaft assembly of the lower end of directed flux motor 100 comprises a grounded inner ring 107 that connects to the ring magnet 101 along the inner edge of the magnet 101. The grounded inner ring 107 has an exterior surface facing outward towards a rotatable inner input ring 106.

The exterior surface of the rotatable inner input ring 106 supports a number of armature or rotor teeth (not shown). The armature teeth are identical in nature and function to the armature teeth 30 described previously in the two-degree-of-freedom first embodiment of FIG. 1. Specifically, the armature teeth of the rotatable inner input ring 106 are wound with wire to create electromagnets as described previously in the two-degree-of-freedom first embodiment of the invention described with respect to FIG. 1. The exterior surface of the inner input ring 106 faces an interior surface of a grounded ring 125 having stator teeth 131. In an exemplary embodiment, the armature teeth on the rotatable inner input ring 106 differ in number from the number of stator teeth 131 mounted on the grounded ring 125 mounted exteriorly to inner input ring 106. For example, five (5) armature or rotor teeth may be provided on the exterior surface of the inner input ring 106 and four (4) stator teeth 131 may be provided on the interior surface of the grounded ring 125.

A plurality of toothed planet gears 112 engage (e.g., mesh) corresponding teeth on the grounded inner ring 107 and the inner input ring 106. The planet gears 112 comprise top portions 112' and larger-diameter bottom portions 112" (with reference to FIG. 2). The bottom portion 112" extends below (in reference to FIG. 2) the inner input ring 106 and grounded inner ring 107 and engages an inner idler ring 118 exterior to the bottom portion 112", and engages an inner output ring 115 interior to the bottom portion 122". The difference in the diameters of the two portions 112', 112" of the planet gears 112 enables torque reduction by the upper portion 112' rotating at a higher speed and lower torque than the lower portion 112".

The outer shaft assembly of the motor 100 is disposed radially outside of the inner shaft assembly described above. The outer shaft assembly is similar in structure and function to the inner shaft assembly which drives the output ring 115. The outer output shaft assembly includes an outer grounded ring 203 that connects to the ring magnet 101 along the outer edge of the ring magnet 101. This connection is hidden from the sectional view of FIG. 2, but should be understood as existing in other sectional planes of the motor 100. The outer grounded ring 203 includes stator teeth (not shown) that face inwardly towards a rotatable outer input ring 204. The rotatable outer input ring 204 supports a number of armature or rotor teeth (not shown) facing the stator teeth of the outer grounded ring 203. In an exemplary embodiment, four (4) stator teeth and five (5) armature or rotor teeth are provided. The rotor teeth are similar in structure and function to the armature or rotor teeth 30 described previously in the two-degree-of-freedom first embodiment of FIG. 1. The armature or rotor teeth of the outer input ring 204 are wound with wire to create electromagnets as described previously in the first embodiment of FIG. 1.

A plurality of toothed planet gears 211 engage corresponding teeth on the outer grounded ring 205 and the rotatable outer input ring 204. The planet gears 211 are comprised of a top portion 211' having a smaller diameter and a bottom portion 211" having a larger diameter. The top portions 211' extend between and mesh with teeth of the outer input ring 204 and the outer grounded ring 205. The bottom portions 211" of the planet gears 211 extend between and engage teeth of an outer idler ring 217 exteriorly to the bottom portions 211", and an outer output ring 214 interiorly to the bottom portions 211". The difference in the diameters of the two portions 211', 211" of the planet gears 211 enables torque reduction by the upper portion 211' rotating at a higher speed and lower torque than the lower portion 211". As with the first embodiment, by controlling the electromagnets of the outer shaft assembly, flux traveling through the outer grounded ring 203 and from the stator teeth to the rotor teeth controls rotation of the rotatable outer input ring 204. Thus, rotation is controllably induced in the planetary gears 211 by the rotatable input ring 204. The planet gears 211, the grounded ring 205, and the idler 217 in turn drive the output shaft 214.

Independent control over the lower two shafts 115, 214 by use of an inner shaft assembly and an outer shaft assembly has been described above. Upper shafts 115a and 214a are controlled independently of one another and shafts 115, 214 using similar inner and outer shaft assemblies that have been designated in FIG. 2 by identical reference numerals, with the addition of the suffix "a". In the interest of brevity, the components and parts of the inner and outer shaft assemblies for controlling the upper shafts 115a, 214a have been omitted, but should be apparent from the above description.

A first flux path A of a plurality of interwoven flux paths of the four-degree-of-freedom system of FIG. 2 will now be described. Flux path A permits for the control over rotation of shaft 115. The flux path A includes flux path segments A1-A5 references in FIG. 2. The flux path segment A1 begins at the south pole of ring magnet 101 and travels down along the outer grounded ring 125 to the stator tooth 131. Flux path segment A2 jumps an air gap between stator tooth 131 and rotor tooth (not shown) on the inner rotatable input ring 106 and crosses planet gear 112 to inner grounded ring 107. Flux path segment A3 travels up the inner grounded ring 107 and across a horizontal portion of the inner grounded ring 107 along segment B4 before terminating at the north pole of the ring magnet 101. If necessary or desirable, the flux path segment A5 will travel along the circumference of the inner grounded ring 107 to reach one of the points connecting the inner grounded ring 107 to the ring magnet 101.

A similar flux path A' (not shown) may be used to control rotation of shaft 115a. Such a flux path A' use bridge portions, such as 107a', to connect to the magnet 101. Stator teeth (not shown), are provided on the grounded ring 131a and rotor teeth (not shown) are provided on the rotatable input ring 106a which drives the shaft 115a through the planetary gears 112a (see FIG. 2).

Another flux path B shown in FIG. 2 includes segments B1-B4. The first flux path segment B1 begins at the south pole of the ring magnet 101 and moves across a horizontal portion an outer grounded sun ring 203a. Flux path segment b1 connects to flux path segment b2, which travels up an outer vertical portion of the outer grounded sun ring 203a. The flux path B continues to flux path segment B3, which crosses the air gap between the stator teeth 203a' on the grounded ring 203a and rotor teeth 204a' on the outer rotatable input ring 204a and crosses the planet gear 211a. Flux path segment B4 directs the magnetic flux down the inner grounded ring 205a and terminates at the north pole of the ring magnet 101. The flux path B allows for control over the rotational movement of shaft 214a.

Figure 3:
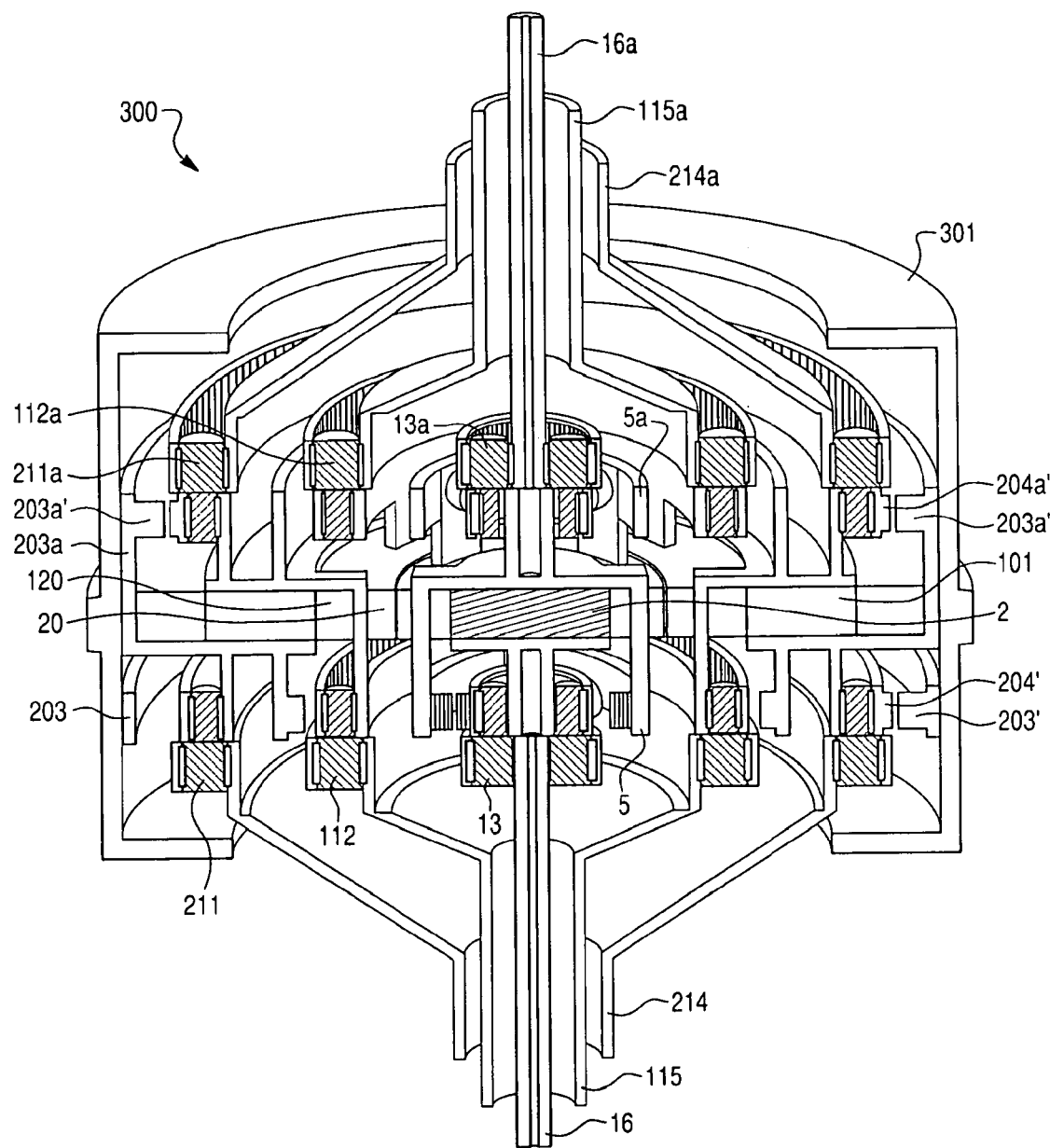
FIG. 3 illustrates front perspective, cross-sectional view of a directed flux motor providing six degrees of freedom according to still another embodiment of the invention.
Figure 4:
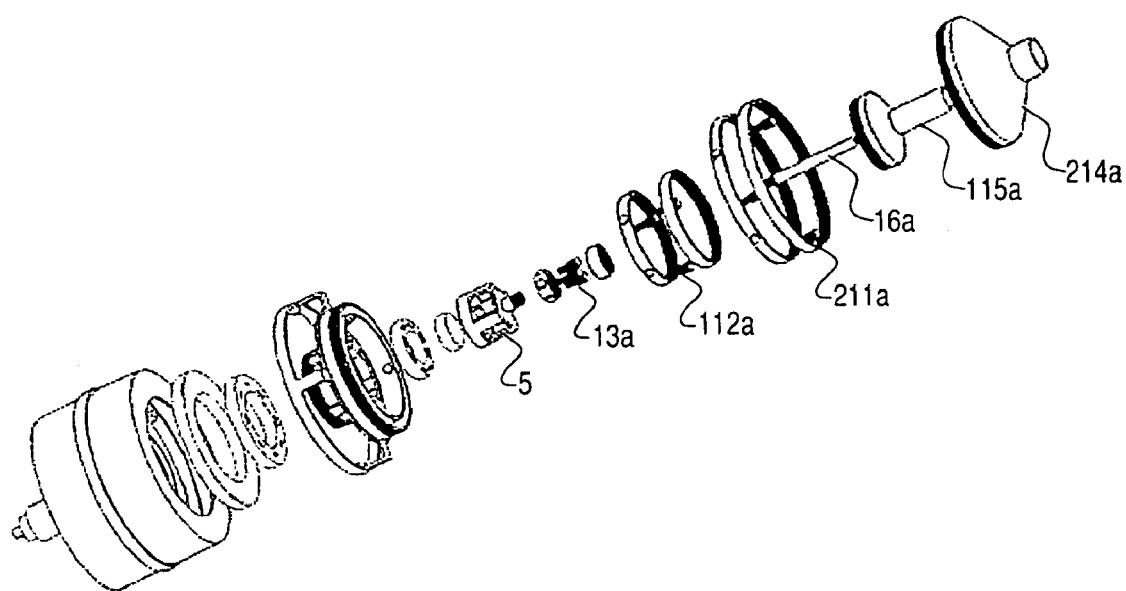
FIG. 4 illustrates an exploded diagram of one half of the preferred embodiment of the invention.
Figure 8:
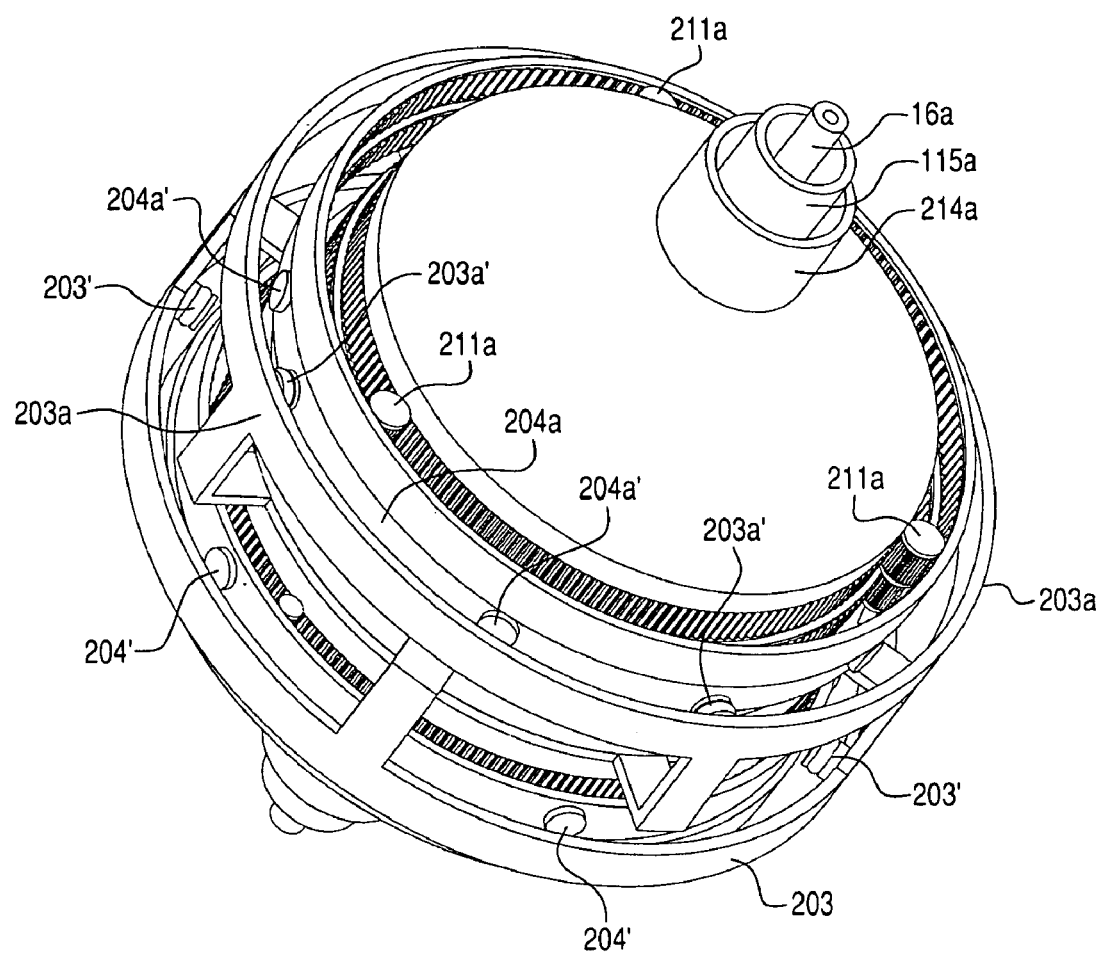
FIG. 8 illustrates a perspective view of the embodiment of FIG. 3.

A similar flux path B' (not shown) may be used to control rotation of shaft 214. Such a flux path B' use bridge portions, such as 107a' above, to connect to the magnet 101. As shown in FIGS. 2, 3 and 8, similar stator teeth 203' are provided on the grounded ring 203 and rotor teeth 204' are provided on the rotatable input ring 204 which drives the shaft 214 through the planetary gears 211 (see FIG. 2).

With these flux paths A, A', B, and B', the electromagnets are controlled to induced attractive and repulsive forces between the respective sets of the stator teeth and corresponding rotor teeth. The rotating motion induced in the rotatable rings 106, 106a, 204, 204a causes rotation of the planetary gear systems defined by the planet gears 112, 112a, 211a, 211a to drive the output shafts 115, 115a, 214, 214a.

Using the foundation of the two-degree-of-freedom first embodiment of FIG. 1 and the four-degree-of-freedom second embodiment of the invention shown in FIG. 2, a six-degree-of-freedom third embodiment of the invention may be constructed by installing the two-degree-of-freedom first embodiment of FIG. 1 into the center of the four-degree-of-freedom second embodiment as shown in FIG. 2. Specifically, the two-degree-of-freedom system of FIG. 1 may be mounted in the central area of the four-degree of-freedom second system of FIG. 2, whereby the outer grounded ring 5 of FIG. 1 is grounded (i.e., non-rotatably fitted) within the system of FIG. 2. Like parts of motor 300 to motors 1 and 100 described above are designated by like reference numerals.

FIG. 3 shows an embodiment of a directed flux motor 300 providing six degrees of freedom in the form of six output shafts. The directed flux motor 300 of FIG. 3 utilizes a disc magnet 2 and a ring magnet 101 circumscribing the disc magnet 2 along a common horizontal plane. Various nested ferrous ring members direct the flux from the magnets 302, 301 to the various stator and rotor teeth to drive the planetary gear systems concentrically arranged within the housing shown in FIG. 7. By grounding the two degree-of-freedom motor 1 within the four degree-of-freedom motor 100, the embodiment of FIG. 3 provides a six degree-of-freedom motor in accordance with this invention. With the previously-described flux paths A, A', B, and B', the electromagnets are controlled to induced attractive and repulsive forces between the respective sets of the stator teeth and corresponding rotor teeth. The rotating motion induced in the rotatable rings 106, 106a, 204, 204a causes rotation of the planetary gear systems defined by the planet gears 112, 112a, 211a, 211a to drive the output shafts 115, 115a, 214, 214a. Likewise, the flux paths C, C" and associated electromagnets, which are described above with respect to FIG. 1, are controlled to induced attractive and repulsive forces between the respective sets of the stator teeth and corresponding rotor teeth (e.g., 30, 40, 30a, 40a). The rotating motion induced in the rotatable rings 9, 9a causes rotation of the planetary gear systems defined by the planet gears 13, 13a to drive the output shafts 16, 16a.

Figure 7:
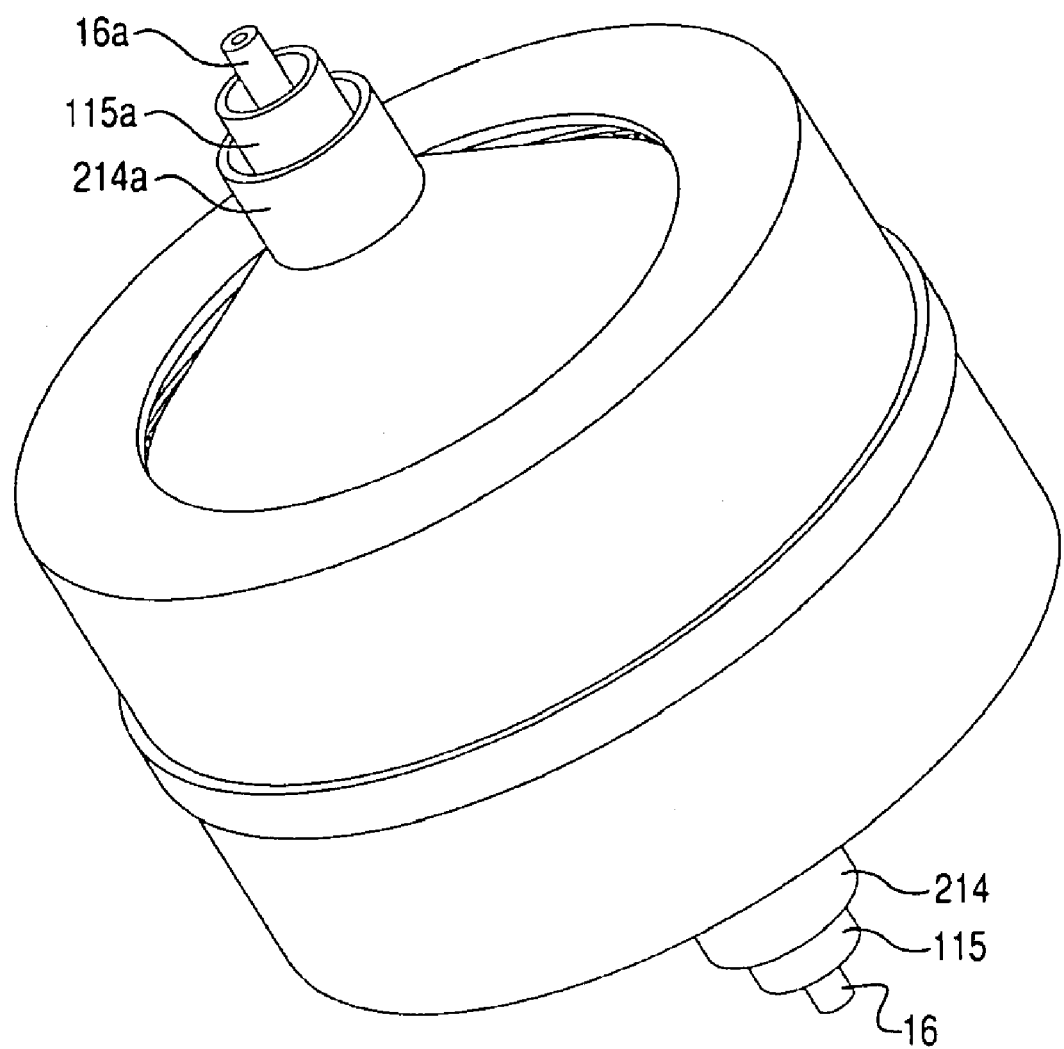
FIG. 7 illustrates the directed flux motor of FIG. 3 with a motor housing.

The illustrated directed flux motor 300 embodied in FIG. 3 comprises a cylindrical, non-ferromagnetic housing from which extend a top outer shaft, a top middle shaft, and a top inner shaft, as well as a bottom outer shaft, a bottom middle shaft, and a bottom inner shaft as shown in FIG. 7.

The directed flux motor 300 utilizes a permanent ring magnet 101 and a permanent disc magnet 2 combination in which both magnets 101, 2 are on the same plane. The ring and disc magnets 101, 2 are both magnetized with a coercivity direction parallel to the axis of rotation. The two magnets 301, 302 are arranged so that like-poles are situated on the same side of the motor 300. The disc magnet 2 is centered in the middle of the ring magnet 101, providing three distinct flux paths.

One of the main principles of the directed flux motor is that flux travels from the North Pole (N) to the South Pole (P) or vice versa. Paths for the flux are created by using ferromagnetic material which has a high magnetic permeability as compared to air. Therefore, the magnetic flux will have a higher concentration along the paths of ferromagnetic material, hereafter referred to as flux channels or paths. This concentration of magnetic flux is available across an air gap for each of the gear bearing assemblies. The stator/rotor teeth which protrude on each side of the air gap concentrate the flux and provide the shortest path for the magnetic flux to cross at specific desired points along the gaps. The completion of the magnetic circuit across the air gaps, between the teeth results in attraction between the closest teeth on either side of the air gaps.

The attraction theory, in which the electromagnets use solely attraction and do not use repulsion, follows conventional stepper motor theory. By timed reversal of polarity, repulsion may also be achieved as would be understood by those of skill in the art. The presence of a complete magnetic circuit across the air gaps opens the opportunity for blocking a flux path across the air gaps, effectively repelling the armature tooth. The resulting bidirectional driving coil, where both attraction and repulsion are utilized, improves upon the conventional stepper theory. Known control circuitry may be utilized to maintain the attraction and repulsion pattern and to change current directions in the coil.

An exemplary control scheme for the invention is similar to the control scheme for a conventional stepper motor as would be understood by those of skill in the art. The exemplary embodiment uses four stator teeth coupled with five armature teeth. The electromagnets on the stator teeth are powered in series, causing the flux to attract the nearest armature tooth to provide the shortest path across the air gap between the stator teeth and the armature teeth. Once the armature tooth has reached the stator tooth, the electromagnet on that stator tooth switches to repulsion (i.e., switched polarity), and repels the armature tooth in the direction that it was traveling, while at the same time the electromagnet on the next stator tooth is switched to attraction and powered on, providing attractive force on the armature tooth. After the armature tooth passes the second attracting stator tooth, the electromagnet on that tooth switches to repulsion, and the electromagnet on the first tooth turns off completely. An embodiment of control output for the four electromagnets acting through a combination of attraction and repulsion is illustrated in FIG. 5, where the x-axis is time (t) and the y-axis shows the voltage (V) for the various coils.

Figure 6:
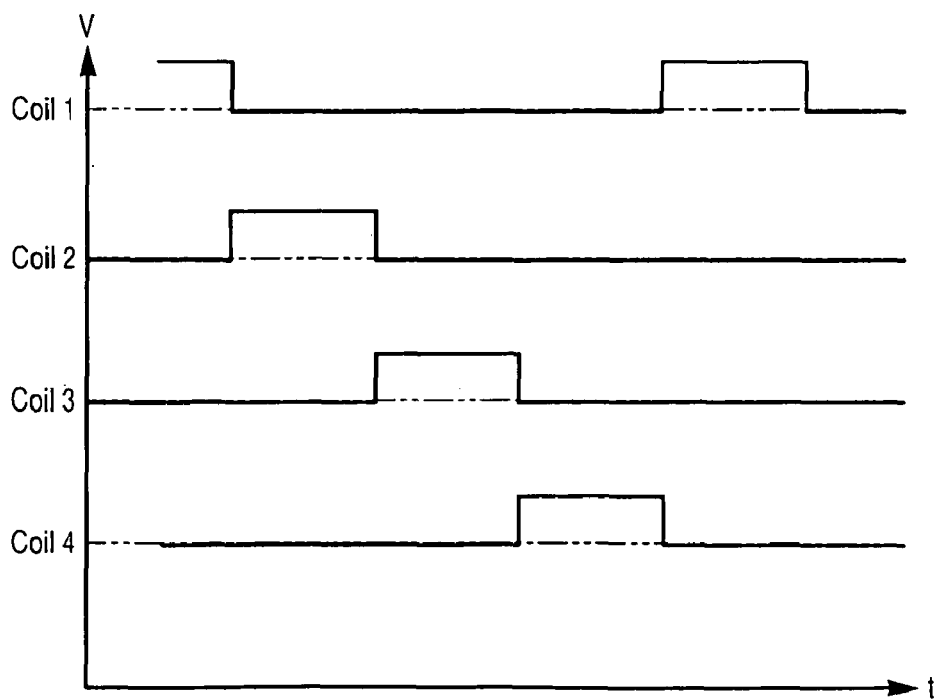
FIG. 6 illustrates the attraction-only control input across the stator teeth wound as electromagnets in the preferred embodiment of the invention.

Control input for the electromagnets acting solely through attraction is shown in FIG. 6, which is similar to FIG. 5, but without repulsion. In the case of FIG. 6, when a pair of teeth is aligned, the electromagnet on the next stator tooth in sequence is powered to attraction, pulling the aligned teeth out of alignment and rotating the rotor. The rotation of the armature or rotor teeth drives the outer ring for all of the planetary gear assemblies, creating a grounded sun configuration for all setups and driving the output shafts. Using both attraction and repulsion provides more force to drive the motor than attraction alone would provide.

As apparent from the foregoing description of the embodiments of FIGS. 1-3, a simplified directed flux motor according to embodiments of the invention utilizes the fundamental concept of directed magnetic flux to achieve rotation through two-, four-, or six-degrees of freedom using magnets. The present invention as embodied in this detailed description achieves new capabilities in up to six actuated shafts that are grouped symmetrically on the motor by utilizing interwoven and nested flux paths, electromagnet winding at the stator teeth, and a combination of attraction and repulsion of the rotor teeth. This capability of multiple independent shafts allows for a wide field of use in vehicle design and rover design as well as other industries. Each degree of freedom can have a different speed and torque combination which can be tailored to the particular use of the motor.

This invention reduces the permanent magnet requirement by enabling the accommodation of multiple (e.g., six) output shafts utilizing a single magnet ring arrangement. This arrangement reduces the depth and overall size of the motor. The intrinsic symmetry of the motor design and concentric magnets allows for multiple degree of freedom configurations with simple, modular changes and improved manufacturability.

While the foregoing invention has been shown and described with referenced to exemplary embodiments of the invention, it will be understood that various changes in form and detail will be apparent to those of skill in the art without departing from the spirit and scope of the present invention as defined by the appended claims.

What is claimed is:
1. A directed flux motor, comprising:
  permanent disc magnet;
  a first ferrous member non-rotatably fixed to said permanent disc magnet;

a second ferrous member non-rotatably fixed to said permanent disc magnet;

a non-ferromagnetic filler interposed between said first and second ferrous members, said filler providing an electrically isolation of said said first and second ferrous members;

said first and second ferrous members defining first and second outer ring members provided with internal stator teeth, said stator teeth being wound with wire to define electromagnets;

first and second inner rotating ring members circumscribed respectively by said first and second outer ring members, said first and second inner rotating ring members provided with rotor teeth facing said stator teeth;

first and second grounded sun members respectively circumscribed by said first and second inner rotating ring members;

a first plurality of planet gears interposed between said first inner rotating ring member and said first grounded sun member, and a second plurality of planet gears interposed between said second inner rotating ring member and said second grounded sun member, said first and second plurality of planet gears having teeth that mesh with corresponding teeth on said inner rotating ring members and said grounded sun members;

a first output put shaft driven by said first plurality of planet gears, a second output shaft drive by said second plurality of planet gears, wherein a first flux path passes from said permanent magnet through said first ferrous member to said first inner rotating ring member through said first plurality of planet gears then through said first grounded sun member and back to said permanent magnet, said first flux path causing rotation of said first inner rotating ring member due to an attraction between said stator and said rotor teeth, and wherein rotation of said first inner rotating ring member causes rotation of said first output drive shaft through rotation of said second plurality of planet gears.

2. The directed flux motor according to claim 1, wherein a second flux path passes from said magnet through said second ferrous member to said second inner rotating ring member through said second plurality of planet gears then through said second grounded sun member and back to said permanent magnet, said second flux path causing rotation of said second inner rotating ring member due to an attraction between said stator and said rotor teeth, and wherein rotation of said second inner rotating ring member causes rotation of said second output drive shaft through rotation of said second plurality of planet gears.

3. The directed flux motor according to claim 2, wherein said first and second output drive shafts are coaxially aligned.

4. The directed flux motor according to claim 2, wherein said first and second output drive shaft extend in opposite directions.

5. The directed flux motor according to claim 1, wherein said permanent magnet is sandwiched between said first and second ferrous members.

6. The directed flux motor according to claim 1, wherein said first and second ferrous members are interwoven and separated by said filler.

7. The directed flux motor according to claim 1, further comprising a control system to selectively energize said stator teeth to create selective attraction and repulsion between said stator teeth and said rotor teeth.

8. The directed flux motor according to claim 1, wherein a number of rotor teeth exceeds a number of stator teeth.

9. The directed flux motor according to claim 1, further comprising a ring magnet circumscribing said permanent disc magnet.

10. The directed flux motor according to claim 9, wherein said ring magnet is electrically connected to four flux paths, said four flux paths driving four separate planetary gearing assemblies, and wherein said four planetary gearing assemblies drive four additional drive shafts.

11. The directed flux motor according to claim 10, wherein said four additional drive shafts are arranged in first and second concentric pairs.

12. The directed flux motor according to claim 11, wherein said first concentric pair is arranged concentric to said first output drive shaft.

13. The directed flux motor according to claim 11, wherein said second concentric pair is arranged concentric to said second output drive shaft.

14. The directed flux motor according to claim 1, wherein said first and second plurality of planet gears are formed as roller gear bearing including planet teeth and a bearing surface adjacent said planet teeth.

* * * * *